Dec. 30, 1947.  R. E. HANSON  2,433,663
PROTECTED FOOD PACKAGE HAVING COACTING TRANSPARENT AND PICTORIAL LABELS
Filed April 8, 1944
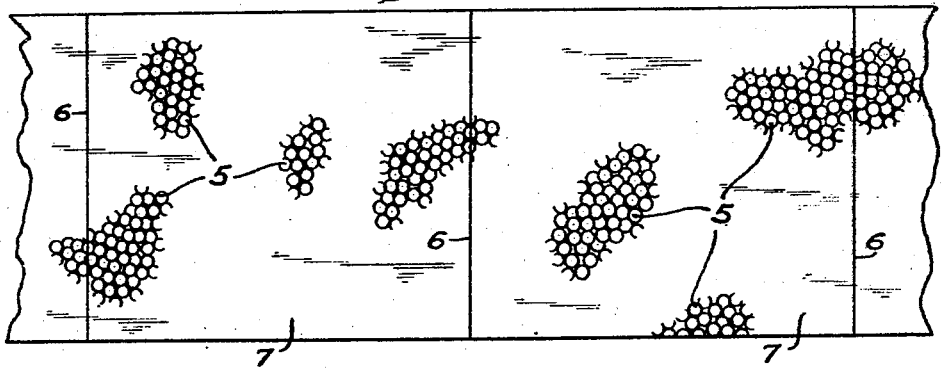
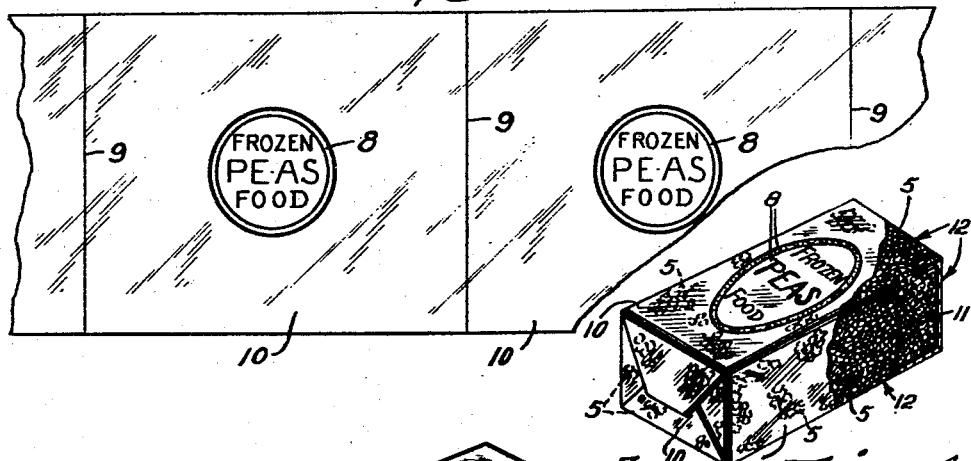
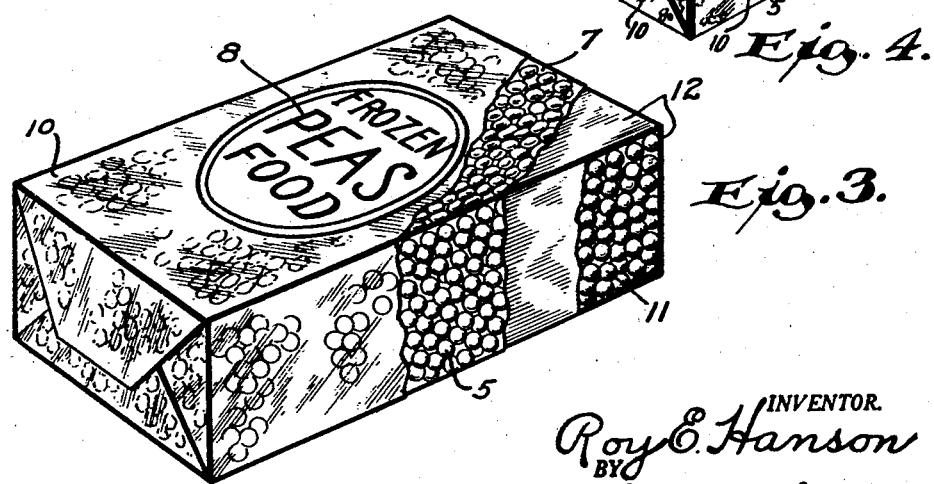
INVENTOR.
Roy E. Hanson
BY
Lieber & Lieber
ATTORNEYS.

Patented Dec. 30, 1947

2,433,663

UNITED STATES PATENT OFFICE 2,433,663

PROTECTED FOOD PACKAGE HAVING CO-ACTING TRANSPARENT AND PICTORIAL LABELS

Roy E. Hanson, Wauwatosa, Wis., assignor to Milprint, Inc., Milwaukee, Wis., a corporation of Delaware Application April 8, 1944, Serial No. 530,083

2 Claims. (Cl. 40—2)

1

The present invention relates in general to improvements in the art of packing diverse commodities; and relates more specifically to an improved method of packaging foods and food products, and to an improved article resulting from commercial exploitation of the new method.

The primary object of my present invention is to provide an improved method of and wrapper for effectively, attractively, and expeditiously packing batches of diverse foods or food products, and especially frozen commodities.

Many foods, and more particularly frozen fresh fruits and vegetables, must be packed in rather durable and sealed containers such as cans or cartons, and should be maintained in frozen and sealed condition until just prior to final consumption thereof. Commodities of this kind are preferably sold in relatively compact batches, and may be either in natural whole condition or cut into pieces, thus establishing many different classes of frozen foods. The frozen product presents a highly attractive and appetizing appearance when kept sealed from the ambient atmosphere and properly cooled so as to retain it in frozen condition; but the confining receptacles should preferably be opaque since the characteristics of the commodities are often impaired by prolonged exposure thereof to light. In order to facilitate merchandising of packages containing batches of such products, it has heretofore been proposed to conceal each batch in a durable sealed carton, and to apply to each carton a single wrapper containing both a true pictorial representation of the confined commodity and other indicia or printing pertaining to the origin and other non-obvious characteristics of the product. These previous individual wrappers while effectively serving their ultimate purposes, were difficult and very expensive to produce as they required costly printing plates for their production and a new plate was necessary for each different class of commodity which was to be packed. This expense thus entailed practically precluded the smaller packers from resorting to the use of such prior wrappers, and it has therefore been extremely difficult because of the excessive cost for such limited producers to properly display and sell their products. Then too, this prior method of packing in which both the relatively attractive but delicate pictorial representation of the confined product was placed directly upon the outer surface of the single wrapping sheet, provided no protection for the picture of the commodity which was apt to become worn and mutilated due to frequent handling, and thus diminished the aesthetic appearance of these previous packages.

2

It is therefore an important object of the present invention to provide an improved mode of packing diverse frozen fruits, vegetables, and other food products at relatively low cost and within proper enclosures, while permitting accurate identification of the confined commodity.

Another object of this invention is to provide an improved package for batches of frozen fruits, vegetables, or other foods, which while effectively enclosing and concealing the batches, will give an attractive visible indication as to the exact nature of the concealed product, and which may also be produced at relatively moderate cost.

A further object of my invention is to provide an improved food merchandising package and method of producing same, wherein the concealed commodity is accurately identified by a constantly visible and attractive pictorial representation of the actual product, and in which the picture is protected against wear and mutilation due to handling of the packages.

These and other specific objects and advantages of the invention will be apparent from the following detailed description.

A clear conception of the several steps involved in my new method of packing, and of the construction of one type of package resulting from the use of this method, may be had by referring to the drawing accompanying and forming a part of this specification wherein like reference characters designate the same or similar parts in the various views.

Fig. 1 is a plan view of a fragment of a sheet of opaque wrapper stock or web provided throughout the area of its outer surface with a pictorial representation of fresh peas or the like;

Fig. 2 is a similar view of a fragment of a sheet of transparent stock provided locally with limited identifying indicia;

Fig. 3 is an enlarged perspective view of a final package containing a batch of fresh frozen peas concealed within a rigid carton which is directly embraced by a wrapper of stock such as shown in Fig. 1 confined within a protective covering of stock such as shown in Fig. 2, and portions thereof having been broken away; and Fig. 4 is a view similar to Fig. 3 and showing the pictorial representation of the packaged product imposed or applied directly upon the material of the enclosed carton of the package.

While the invention has been shown herein by way of simple illustration, as having been embodied in a package containing a batch of fresh frozen peas confined within a rigid carton and an opaque main wrapper and a transparent outer wrapper, it is not desired to unnecessarily limit the same by virtue of such specific disclosure, and it is to be understood that the improvement is more generally applicable to the packing of diverse foods and other commodities comprising whole or subdivided objects either in relatively dry state or mixed with juice or other liquid.

In accordance with my improved packing method, I first conceal each batch of the commodity within an enclosure having its external surface provided with a true pictorial representation of the confined product, and I subsequently apply other identifying indicia to the exterior of the main enclosure. The pictorial representation should preferably accurately display the shape, shading and color of the commodity as it would actually apear if a fragment of the enclosure were removed; and may be produced by printing or otherwise either in local spots or throughout the entire external surface area of the enclosure. The enclosure may be either a relatively rigid carton having the picture of the concealed commodity applied directly to its outer surface, or applied to a separate wrapping sheet embracing the carton; and the additional identifying indicia may be in the form of a local label secured to the pictorial surface, but is preferably constructed in the form of a transparent protective outer wrapper which covers the pictorial representation and has local printing or other identifications thereon designating the origin, weight, or other characteristics of the goods.

Referring to the drawing, Fig. 1 represents a fragment of a continuous ribbon, web or sheet of opaque wrapper stock color printed throughout the entire area of its outer surface with a continuous pictorial representation 5 of fresh peas, and which may be severed along transverse lines 6 into a succession of individual opaque wrappers 7 of approximately equal size each having the representation 5 repeated throughout its entire area. Fig. 2 represents a fragment of a continuous ribbon or sheet of auxiliary wrapper stock printed locally with indicia 8 designating further the specific nature of the commodity which it is intended to confine within the opaque wrappers 7, and which may also be severed along lines 9 to produce successive individual transparent wrappers 10 of approximately equal size each having one or more of the local indicia 8 thereon.

A batch of fresh frozen peas 11 such as actually depicted in the pictorial representation 5, may be confined and sealed within a relatively rigid carton 12 as shown in Figs. 3 and 4, whereupon individual opaque and transparent wrappers 7, 10 (Fig. 3) may be applied to the carton 12 in superimposed relationship, so as to produce the completed package shown. In the completed package, the rigid carton 12 effectively confines and conceals the peas 11, and the main opaque wrapper 7 not only additionally protects the carton 12 and the peas 11, but presents a constantly visible and accurate picture of the peas 11 confined within the carton 12. The outer transparent wrapper 10 besides protecting the pictorial representation 5, provides for constant visibility of the pictorial representation 5, and also permits added indicia 8 to be applied to the package. By virtue of the fact that the indicia 8 is applied to a transparent wrapper 10, the printing of this indicia may be effected on the inside of the wrapper 10, thus protecting the printed matter and preventing the same from being rubbed or worn off due to frequent handling. The entire package obviously presents a highly attractive appearance and gives an immediate and accurate indication at all times of the commodity actually confined therein; and by separately manufacturing the wrappers 7, 10, these may obviously be produced at extremely moderate cost since the printing plates for producing the pictorial representation of the commodity can be utilized in packages of diverse sizes and containing the products of many different producers. The invention herein contemplates the true pictorial representation of the packaged comestible imposed directly upon the enclosed carton shown in Fig. 4, as well as upon the separate inner opaque wrapper sheet 7 of Figs. 1 and 3.

From the foregoing detailed description it will be apparent that my present invention provides an improved method of packing diverse commodities in an attractive and expeditious manner, so as to constantly portray the exact contents of the packages. The invention is obviously applicable for packing many different commodities, and is especially useful in connection with the packaging of frozen fruits and vegetables such as strawberries and other delicate fruits, and peas and other vegetables, and the fruits and vegetables may be either in natural or whole condition, or they may be severed into pieces. The pictorial representations 5 may be reproduced as to size, shading, and color, so as to provide a true picture of the commodities themselves, and since the pictures are of a relatively delicate nature, it is preferable to cover and protect the same with a transparent protecting wrapper as shown and described herein. As previously indicated, the improvement is advantageously applicable for the packing of diverse foods, as well as other commodities, and the cost of producing the two wrappers 7, 10 by the present method is only a fraction of the cost of producing the previous single wrappers having both the pictorial representation and the other indicia printed thereon from specially made plates.

It should be understood that it is not desired to limit this invention to the exact steps of the method, or to the exact details of construction of the wrappers, wherein described and shown, for various modifications within the scope of the claims may occur to persons skilled in the art.

I claim:

1. A protected package of a comestible which may be frozen, comprising an innermost entirely closed opaque substantially rigid rectangular paper carton containing said comestible, an inner opaque sheet completely enclosing the carton and having upon its exposed outer surface a true colored pictorial representation of the comestible contained within the carton, and an outer transparent wrapper sheet completely enclosing said inner opaque sheet to protect the same and the colored pictorial representation thereon against damage while rendering completely visible from any angle said pictorial representation of the comestible contained within said rigid package, said outer sheet having localized indicia thereon further designating the nature of the packaged contents.

2. A protected rigid paper package of a comestible which may be frozen, comprising an innermost entirely closed opaque substantially rigid rectangular carton containing said comestible, said carton having a true colored printed pictorial representation of the concealed comestible within the carton disposed over the entire outer surface thereof, and an outer transparent wrapper sheet completely enclosing said carton to protect the same and the colored pictorial representation thereon against damage while rendering completely visible from any angle said pictorial representation of the comestible contained within said rigid package, said outer sheet having localized indicia thereon further designating the nature of the packaged contents.

ROY E. HANSON.

REFERENCES CITED

The following references are of record in the file of this patent:

UNITED STATES PATENTS

| Number | Name | Date |
|---|---|---|
| 626,568 | Rowland et al. | June 6, 1899 |
| 1,203,963 | Bentley | Nov. 7, 1916 |
| 1,312,611 | Chess | Aug. 12, 1919 |
| 1,329,207 | Peppers | Jan. 27, 1920 |
| 1,661,479 | Josephson | Mar. 6, 1928 |
| 1,852,228 | Birdseye | Apr. 5, 1932 |
| 1,208,828 | Planco | Dec. 19, 1916 |
| 2,069,609 | Hanson | Feb. 2, 1937 |
| 2,207,793 | Freeman | July 16, 1940 |

OTHER REFERENCES

Page 212, "1942 Packaging Catalogue", 1942.
Page 13, "March 1942, Packaging Parade," March 1942.
Page 5, "Packaging Parade," vol. 7, May 1939.